(12) United States Patent
Sung et al.

(10) Patent No.: US 12,390,845 B2
(45) Date of Patent: Aug. 19, 2025

(54) SEDIMENT-RECYCLING METHOD

(71) Applicant: YI JIM PLASTICS ENTERPRISE CO., LTD., Taichung (TW)

(72) Inventors: Wei-Che Sung, Taichung (TW); Ching-Mu Sung, Taichung (TW)

(*) Notice: Subject to any disclaimer, the term of this patent is extended or adjusted under 35 U.S.C. 154(b) by 276 days.

(21) Appl. No.: 18/144,849

(22) Filed: May 9, 2023

(65) Prior Publication Data
US 2024/0375159 A1     Nov. 14, 2024

(51) Int. Cl.
| | |
|---|---|
| B09C 1/06 | (2006.01) |
| B29B 9/12 | (2006.01) |
| C04B 14/10 | (2006.01) |
| C04B 20/06 | (2006.01) |

(52) U.S. Cl.
CPC .............. *B09C 1/06* (2013.01); *B29B 9/12* (2013.01); *C04B 14/10* (2013.01); *C04B 20/06* (2013.01); *B29B 2009/125* (2013.01)

(58) Field of Classification Search
CPC ...... C04B 14/10–12; C04B 20/06–068; B09C 1/06; B29B 9/12; B29B 2009/125
See application file for complete search history.

(56) References Cited

U.S. PATENT DOCUMENTS

2005/0239934 A1 * 10/2005 Agra-Gutierrez .......... C08J 5/18
                                              524/274

OTHER PUBLICATIONS

Laursen et al., Recycling of an industrial sludge and marine clay as light-weight aggregates, Journal of Environmental Management, 80 (2006), 208-213 (Year: 2005).*
Liao et al., Effects of heat treatment on the physical properties of lightweight aggregate from water reservoir sediment, Ceramics International 37 (2011), 3723-3730 (Year: 2011).*
Liao et al., Lightweight aggregates from water reservoir sediment with added sodium hydroxide, Construction and Building Materials, 46 (2013), 79-85 (Year: 2013).*
Chen et al., Producing synthetic lightweight aggregates from reservoir sediments, Construction and Building Materials, 28 (2012), 387-394 (Year: 2011).*
Liao et al. (Year: 2011).*
Liao et al. (Year: 2013).*
Chen et al. (Year: 2011).*
Laursen et al. (Year: 2005).*

* cited by examiner

*Primary Examiner* — Jeffrey M Wollschlager
(74) *Attorney, Agent, or Firm* — Bruce Stone LLP; Joseph A. Bruce

(57) ABSTRACT

A sediment-recycling method includes steps of collecting organic clay from sediment, sintering the clay into porous light-weighted material, breaking the porous light-weighted material into porous aggregate, blending the porous aggregate with modifier to provide a compound, turning the compound into pellets, melting the pellets to provide liquid, and molding the liquid into a final product. The weight of the porous aggregate is 80% of the weight of the compound and the weight of the modifier is 20% of the weight of the compound.

3 Claims, 2 Drawing Sheets

SEDIMENT-RECYCLING METHOD

BACKGROUND OF INVENTION

1. Field of Invention

The present invention relates to protection of the environment and, more particularly, to a sediment-recycling method useable for a water reservoir.

2. Related Prior Art

A water reservoir is often built in a low-lying area in a mountain or a hill to collect water. A scale is often made on a wall or a damp to indicate volume of water in of such a water reservoir. However, actual volume of water is less than the indicated volume of water due to sediment at the bottom of the water reservoir. Hence, it is necessary to remove the sediment from such a water reservoir.

After removed from such a water reservoir, the sediment is laid unstirred in another place adjacent to such a water reservoir for water to be vaporized from the sediment to reduce the water content in the sediment. Then, the sediment is moved to another place to be further processed. However, the sediment still contains a lot of water after it is left unstirred for some time, it is hence difficult to find a place that is large enough to contain the sediment or to further process the sediment.

The sediment contains a relatively large amount of clay and relatively small amounts of sand, silt and organic substances. The sediment can be processed to produce environmentally friendly building materials for. The processing is intended to increase ability for repulsion of water so that the sediment can be turned into light-weighted building materials that are good at repulsion of water. Such building materials can be waterproof cement or light-weighted aggregate for example.

Taiwanese Patent Application Publication No. 201114509 discloses a method for making light-weighted aggregate. Quartz tiles are ground and sieved so that rough particles are separated from fine particles. The fine particles are mixed with sediment from a water reservoir. Then, the mixture is turned into a semi-product in a process including spray granulation and molding, a process including dehydration and extrusion, or a process including dehydration and granulation. Then, the semi-product is sintered at 1120 to 1180 degrees Celsius and turned into light-weighted aggregate. The sintering causes air in the semi-product to expand so that the aggregate is porous, light-weighted, sound-insulating and heat-insulating. However, the pores in the aggregate comprise water-proofness of the aggregate and strength of any thing made of the aggregate.

A method for modification of clay is often used in modification of montmorillonite. Briefly, the montmorillonite is purified and processed with a modifying agent so that it becomes lipophilic to admit monomer into a silicon layer. Due to polymerization, nanometer-grate montmorillonite is mixed with polymer to provide a composite material with good mechanical and thermal properties. A grave problem with this method is that the purification costs a lot and hence renders the composite material expensive.

Taiwanese Patent No. 1263624 discloses an inexpensive method for modifying sediment from a water reservoir in comparison with the purification of the montmorillonite. Cationic surfactant is used for exchange of cations so that a layer of silicon of the sediment is turned into hydrophobic from hydrophilic before the sediment is used to make a building material.

Taiwanese Patent Application Publication No. 201210980 discloses an additive into sediment from a water reservoir. Then, the mixture of the sediment with the additive is made into a building material such as light-weighted aggregate, light-weighted bricks and foam plates in chemical manner without having to be dried and ground.

Taiwanese Patent Application Publication No. 201210982 discloses an additive into sediment from a water reservoir to provide metallic ions and hydroxide after the sediment is dehydrated. Then, the mixture of the sediment with the additive is treated with heat to produce a building material such as light-weighted aggregate, light-weighted bricks and foam plates.

The present invention is therefore intended to obviate or at least alleviate the problems encountered in the prior art.

SUMMARY OF INVENTION

It is the primary objective of the present invention to provide an inexpensive and effective method for recycling sediment from a water reservoir.

To achieve the foregoing objective, the sediment-recycling method includes steps of collecting organic clay from sediment, sintering the clay into porous light-weighted material, breaking the porous light-weighted material into porous aggregate, blending the porous aggregate with modifier to provide a compound, turning the compound into pellets, melting the pellets to provide liquid, and molding the liquid into a final product. The weight of the porous aggregate is 80% of the weight of the compound and the weight of the modifier is 20% of the weight of the compound.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
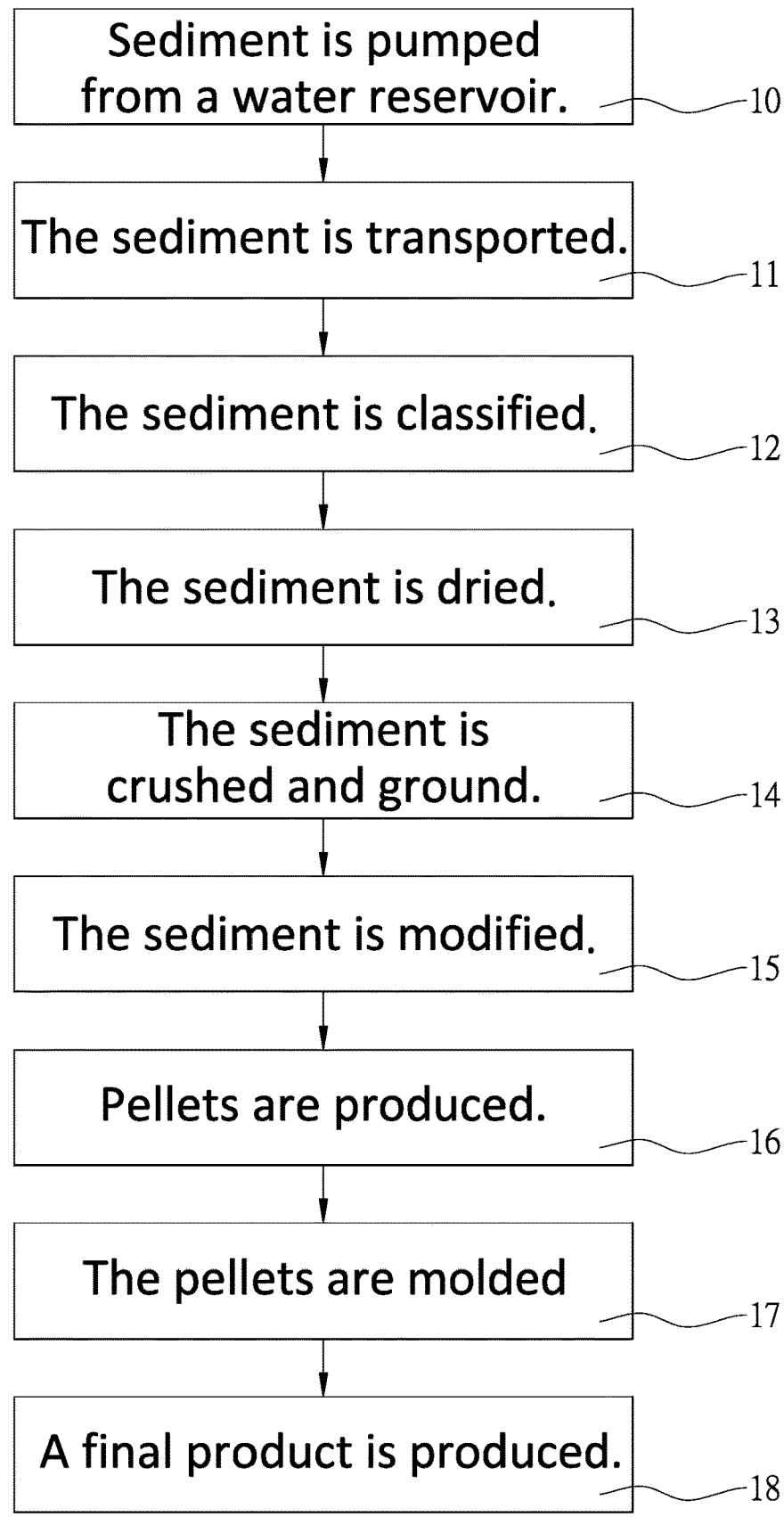
FIG. 1 is a flow chart of a sediment-recycling method according to the preferred embodiment of the present invention.

Referring to FIG. 1, a sediment-recycling method includes steps 10 to 18 according to the preferred embodiment of the present invention. At step 10, sediment is pumped from a water reservoir. At step 11, the sediment is transported. At 12, the sediment is classified. At step 13, the sediment is dried. At step 14, the sediment is crushed and ground. At step 15, the sediment is modified. At step 16, pellets are produced. At step 17, the pellets are molded. At step 18, a final product is produced.

Figure 2:
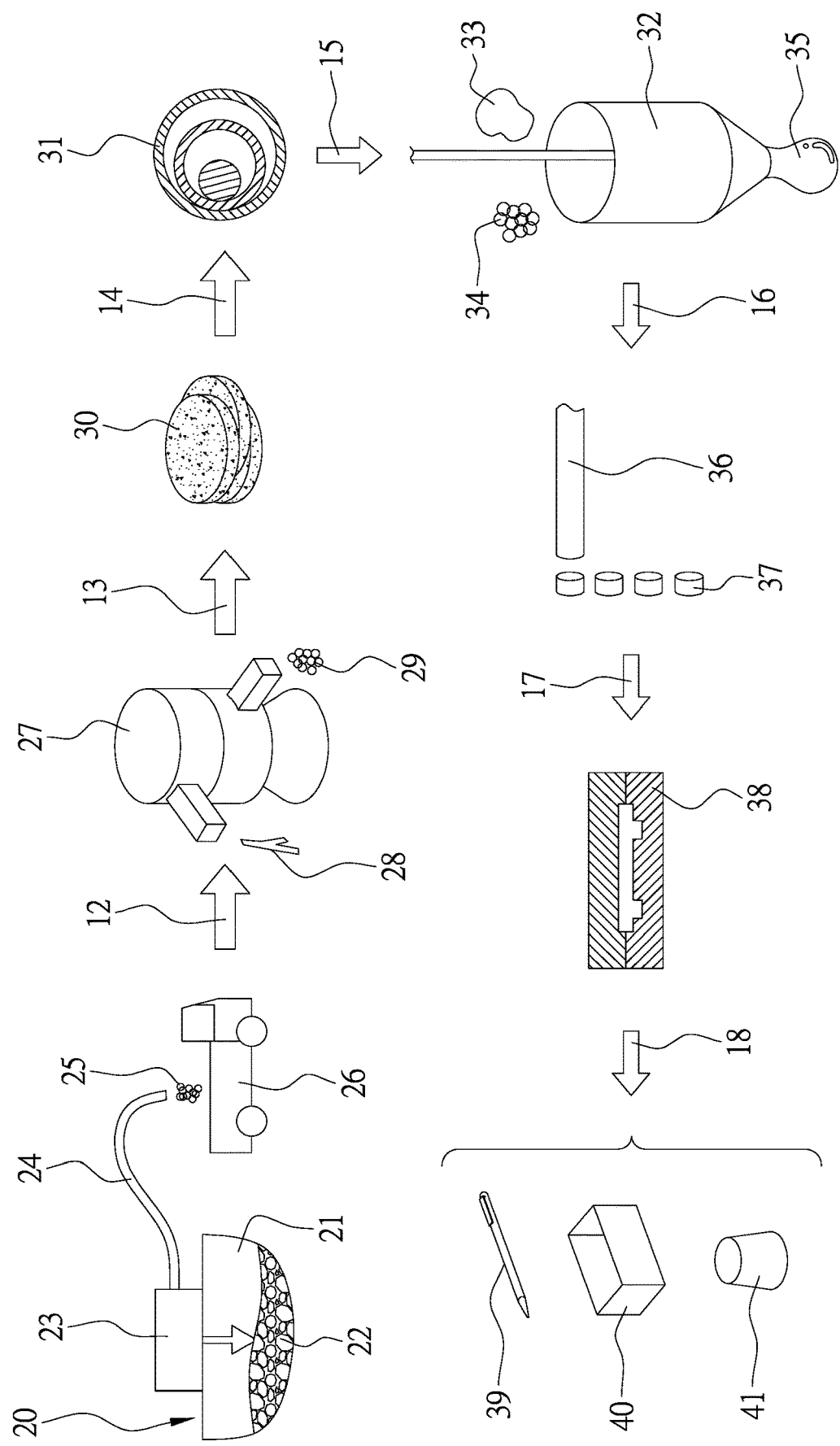
FIG. 2 is a perspective view of various phases of the sediment-recycling method used for a water reservoir.

Referring to FIGS. 1 and 2, at step 10, a sand pump 23 is located on the surface of water 21 in a water reservoir 20. The sand pump 23 is used to pump sediment from a bottom 22 of the water reservoir 20.

At step 11, after pumped from the bottom 22 of the water reservoir 20, the sediment 25 is sent to a vehicle 26 from the sand pump 23 through a pipe 24.

At step 12, a vibrating-screen classifier 27 is used to classify the sediment 25 into debris 28, gravel 29 and clay that contains organic substances. The clay will be used.

At step 13, the clay is dehydrated. Then, the clay is sintered at about 1200° C. to provide a light-weighted material 30. The sintering causes the clay to expand and become the light-weighted material 30 in the form of a porous plate. The light-weighted material 30 can be circular or in any other shape.

At step 14, an eccentric grinder 31 is used to turn the light-weighted material 30 into porous aggregate 33. The eccentric grinder 31 can however be replaced any other proper crusher or grinder.

At step 15, a blender 32 is used to blend the porous aggregate 33 with modifier 34 at high pressure in a physical manner. The mixture of the porous aggregate 33 with the modifier 34 is turned made into a compound 35. The modifier 34 fill pores in the porous aggregate 33 to prevent the porous aggregate 33 from absorbing water.

The porous aggregate 33 is blended with the modifier 34 at an advantageous ratio to produce the compound 35. Preferably, the weight of the porous aggregate 33 is about 80% of the weight of the compound 35 and the weight of the modifier 34 is about 20% of the weight of the compound 35.

Preferably, regarding the weight, the modifier 34 includes natural adhesive that is about 5% of the compound 35 and plastic particles that are about 15% of the compound 35. The weight of the modifier 34, which is the sum of the weight of the natural adhesive and the weight of the plastic particles, is about 20% of the weight of the compound 35.

Preferably, the natural adhesive can be natural rubber, animal adhesive, vegetable adhesive, mineral adhesive, oceanic natural adhesive, protein adhesive, carbohydrate adhesive, natural resin adhesive, starch adhesive (such as starch oxide adhesive, esterified starch adhesive and high hydroscopic starch adhesive), cellulose adhesive (such as cellulose ether derivative and cellulose acetate derivative), tannic adhesive, lignin adhesive, gum Arabic adhesive or inorganic adhesive.

Preferably, the plastic particles are made of thermoplastics or thermosetting plastics such as polypropylene (PP), polystyrene (PS), high-impact polystyrene (HIPS), acrylonitrile-butadiene-styrene (ABS), polyethylene terephthalate (PET), polyester (PES), polyamide (PA), polyvinylchloride (PVC), polyurethane (PU), polycarbonate (PC), polyvinylidene chloride (PVDC), polyethylene (PE), polymethylmethacrylate (PMMA), polytetrafluoroethylene (PTFE), polyetheretherketone (PEEK), polyetherimide (PEI), phenolic formaldehyde resin (PF), urea-formaldehyde resin (UF), melamine formaldehyde resin (MF) and poly lactic acid (PLA).

At step 16, the compound 35 is molten and turned into liquid. Then, the molten compound 35 is cooled and turned into a string 36. Then, the string 36 is cut into pellets 37. The porous aggregate 33 is blended with the modifier 34 before they are molten. Hence, the clay, the natural adhesive and the plastic particles are merged to render the properties of the string 36 and the pellets 37 different from the properties of the modifier 34. In addition, the pellets 37 are not porous.

At step 17, the pellets 37 is fed to an injection molding machine in which the pellets 37 are molten and turned into liquid that is injected into a mold 38 by a plunger or threaded rod. The liquid is cooled in the mold 38 and turned into a solid final product.

At step 18, the mold 38 is opened and the final product is moved from the mold 38. The final product 18 can be a stationary 39 such as a pen. Alternatively, the final product can be a container 40 such as a case. Alternatively, the final product can be a cap or plug 41.

As discussed above the steps 10 through 18, the sediment is recycled and modified. Hence, the properties of compound 35 is quite different from the qualities of the modifier 34 or the properties of the sediment.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A sediment-recycling method comprising:
collecting organic clay from sediment;
sintering the clay into porous material;
breaking the porous material into porous aggregate;
providing a modifier with natural adhesive and plastic particles;
blending the porous aggregate with the modifier to provide a compound, wherein the weight of the porous aggregate is 80% of the weight of the compound, wherein the weight of the natural adhesive is 5% of the weight of the compound, wherein the weight of the plastic particles is 15% of the weight of the compound;
turning the compound into pellets;
melting the pellets to provide liquid; and
molding the liquid into a final product.

2. The sediment-recycling method according to claim 1, wherein the natural adhesive is selected from the group consisting of natural rubber, animal adhesive, vegetable adhesive, mineral adhesive, oceanic natural adhesive, protein adhesive, carbohydrate adhesive, natural resin adhesive, starch adhesive, starch oxide adhesive, esterified starch adhesive, hydroscopic resin adhesive, cellulose adhesive, cellulose ether derivative, cellulose acetate derivative, tannic adhesive, lignin adhesive, gum Arabic adhesive and inorganic adhesive.

3. The sediment-recycling method according to claim 1, wherein the plastic particles are made of at least one material selected from the group consisting of polypropylene (PP), polystyrene (PS), high-impact polystyrene (HIPS), acrylonitrile-butadiene-styrene (ABS), polyethylene terephthalate (PET), polyester (PES), polyamide (PA), polyvinylchloride (PVC), polyurethane (PU), polycarbonate (PC), polyvinylidene chloride (PVDC), polyethylene (PE), polymethylmethacrylate (PMMA), polytetrafluoroethylene (PTFE), polyetheretherketone (PEEK), polyetherimide (PEI), phenolic formaldehyde resin (PF), urea-formaldehyde resin (UF), melamine formaldehyde resin (MF) and poly lactic acid (PLA).

* * * * *